(12) United States Patent
Hu et al.

(10) Patent No.: US 9,443,280 B2
(45) Date of Patent: Sep. 13, 2016

(54) SELECTIVE HARDWARE ACCELERATION IN VIDEO PLAYBACK SYSTEMS

(75) Inventors: Ningxin Hu, Shanghai (CN); Yongnian Le, Shanghai (CN); Xuefeng Deng, Shanghai (CN)

(73) Assignee: Intel Corporation, Santa Clara, CA (US)

(*) Notice: Subject to any disclaimer, the term of this patent is extended or adjusted under 35 U.S.C. 154(b) by 26 days.

(21) Appl. No.: 13/995,687

(22) PCT Filed: Dec. 30, 2011

(86) PCT No.: PCT/CN2011/084982
§ 371 (c)(1),
(2), (4) Date: Nov. 15, 2013

(87) PCT Pub. No.: WO2013/097163
PCT Pub. Date: Jul. 4, 2013

(65) Prior Publication Data
US 2014/0313209 A1 Oct. 23, 2014

(51) Int. Cl.
| | |
|---|---|
| G06F 15/16 | (2006.01) |
| G06T 1/00 | (2006.01) |
| G06F 15/00 | (2006.01) |
| G06T 1/20 | (2006.01) |
| H04N 21/426 | (2011.01) |
| G06F 17/30 | (2006.01) |
| H04N 19/423 | (2014.01) |

(52) U.S. Cl.
CPC ........... *G06T 1/20* (2013.01); *G06F 17/30899* (2013.01); *H04N 21/42653* (2013.01); *H04N 19/423* (2014.11)

(58) Field of Classification Search
None
See application file for complete search history.

(56) References Cited

U.S. PATENT DOCUMENTS

| | | | |
|---|---|---|---|
| 2008/0120626 A1* | 5/2008 | Graffagnino | ........ G06F 17/2205 719/320 |
| 2009/0228782 A1 | 9/2009 | Fraser et al. | |

(Continued)

FOREIGN PATENT DOCUMENTS

| | | |
|---|---|---|
| CN | 102147923 A | 8/2011 |
| TW | 201035854 A | 10/2010 |

(Continued)

OTHER PUBLICATIONS

"International Application Serial No. PCT/CN2011/084982, International Preliminary Report on Patentability mailed Jul. 10, 2014,", 7 pgs.

(Continued)

*Primary Examiner* — Jacinta M Crawford
(74) *Attorney, Agent, or Firm* — Schwegman Lundberg & Woessner, P.A.

(57) ABSTRACT

Embodiments of a system and method for enhanced video performance in a video playback system are generally described herein. In some embodiments, a video frame from a video element in a web page, which is to be presented in a web browser and is unobscured by any other elements associated with the web page, the web browser, or a user interface, is directly rendered by a hardware decoder and composited with any associated web content or other elements directly to a video playback display device. When a video frame from the video element is obscured by another element the video frame is rendered by a processor in the video playback display device in order to incorporate the non-video graphics element on the video playback device.

20 Claims, 9 Drawing Sheets

(56) References Cited

U.S. PATENT DOCUMENTS

| | | | |
|---|---|---|---|
| 2010/0245584 A1 | 9/2010 | Minasyan et al. | |
| 2011/0221959 A1 | 9/2011 | Yehuda et al. | |
| 2013/0127849 A1* | 5/2013 | Marketsmueller | G06T 15/00 |
| | | | 345/420 |
| 2013/0147787 A1* | 6/2013 | Ignatchenko | G06T 11/60 |
| | | | 345/419 |

FOREIGN PATENT DOCUMENTS

| | | |
|---|---|---|
| TW | 201344465 A | 11/2013 |
| WO | WO-2013097163 A1 | 7/2013 |

OTHER PUBLICATIONS

"Taiwanese Application Serial No. 101149000, Office Action mailed Aug. 28, 2014", 50 pgs.

"Taiwanese Application Serial No. 101149000, Response filed Nov. 28, 2014 to Office Action mailed Aug. 28, 2014", W/ English Claims, 8 pgs.

"International Application Serial No. PCT/CN2011/084982, Search Report mailed Oct. 18, 2012", 3 pgs.

"International Application Serial No. PCT/CN2011/084982, Written Opinion mailed Oct. 18, 2012", 5 pgs.

\* cited by examiner

SELECTIVE HARDWARE ACCELERATION IN VIDEO PLAYBACK SYSTEMS

PRIORITY CLAIM TO RELATED APPLICATIONS

This application is a national stage application under 35 U.S.C. §371 of PCT/CN2011/084982, filed Dec. 30, 2011, and published as WO2013097163A1 on Jul. 4, 2013, which application and publication are incorporated by reference as if reproduced herein and made a part hereof in their entirety, and the benefit of priority of which is claimed herein.

BACKGROUND

User equipment (UE) may include computers, smart phones, laptops, set-top boxes, video game consoles, or other network enabled devices. Such equipment may be configured to provide video playback, but may have limited resources (e.g., processor capability, battery life, etc.) for video rendering. The resource limits of equipment may impact the ability of the equipment to provide smooth video-playback in high definition (HD) that is acceptable to users. The speed of both wired and wireless networks have increased, and users are increasingly demanding high quality video performance from their equipment. For example, HD video is becoming more widely available on these networks. Dedicated video acceleration hardware may enhance video playback performance; however not all hardware platforms may currently provide the high quality playback performance associated with HD video.

The video rendering processes in a typical video or multimedia playback system may be computationally intensive and may greatly affect overall system performance of UE. The demands of high-definition video may slow down equipment response times, introduce overall system lag or unresponsiveness, or resulting in a low quality video playback in the form of reduced frame per second (FPS) rendering performance. The failure of UE to handle the performance needs of HD video may result in an undesirable user experience and user frustration.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
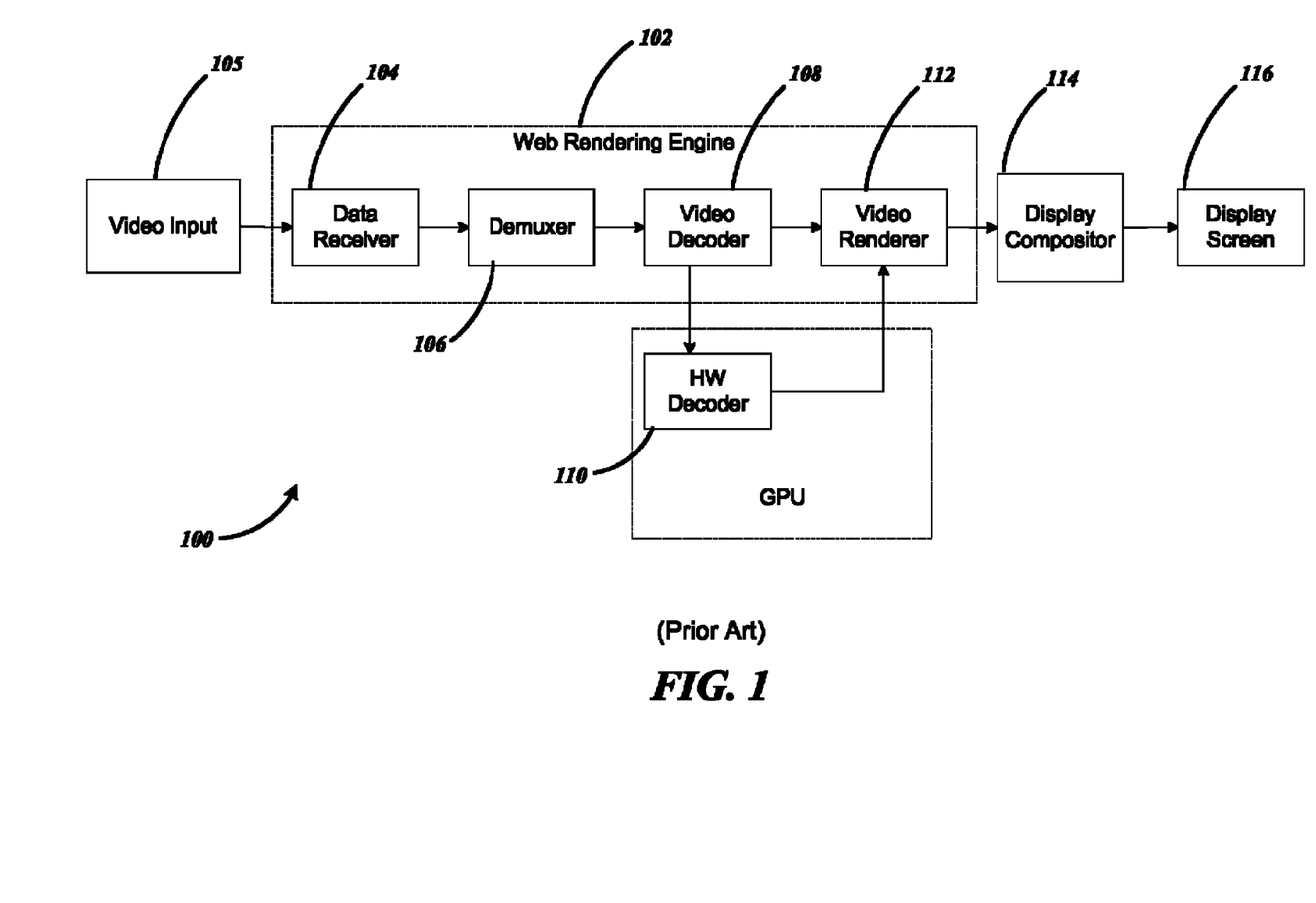
FIG. 1 illustrates a block diagram illustrating an example video playback processing system including a web rendering engine capable of presenting video input on a display screen.

FIG. 1 illustrates an example of a video playback system utilizing a media pipeline 100 to process and present a video, such as a video presented in a web page formatted with an Hypertext Markup Language v.5 (HTML5) canvas, in a web browser. A web page can be any document or file that may include a reference, tag, or link to a video. Examples of web pages include, but are not limited to, extensible markup language (XML) documents, HTML documents, and HTML5 documents that include a <video> tag. Web browsers are typically present on user equipment (UE), including both desktop and mobile computing devices, to allow a user to interact with multimedia received over a network or previously loaded onto the UE. Videos in a variety of formats that are compatible with the HTML5 standard are available from any number of websites hosted on the Internet and generally supported in modern web browsers. Typical web browsers utilize a media pipeline 100 and web rendering engine 102 to process and present a video to a user. Four common elements in the web rendering engine 102 are a data receiver 104, a demultiplexer (demuxer) 106, a video decoder 108, and a video renderer 112. Examples of rendering engines, also known as layout engines, include: Trident (used in at least version 9 of the Internet Explorer® web browser), Gecko® (used in the Firefox® web browser), and WebKit (used in the Apple® Safari® and Google Chrome™ web browsers).

Some computers and mobile devices with limited processor computation capability may not be able meet the requirements necessary to properly render and decode a high quality video stream at a rate that is fast enough to properly display the video. One solution to processor limited devices is to include a hardware video decoder 110 in a graphics processing unit (GPU) that may accelerate the video decoding and color space conversion processing during video processing. Video decoding and color space conversion are computationally intensive processes that may benefit from dedicated hardware components, sometimes referred to as video processors, in the media pipeline 100.

FIG. 1 illustrates an example device with a web rendering engine 102 that offloads the video decoding to a hardware decoder 110. The web rendering engine 102 handles a video stream by repeatedly performing a sequence of receiving, processing, and displaying events for each video frame as it is received. In an example, the web rendering engine may be implemented on a processor configured to receive data from a video source and display the video on a display coupled to the processor.

A data receiver 104 receives a video stream from an input 105, such as a video stream downloaded from the Internet. A demuxer 106 demultiplexes the video stream into separate video frame and audio portions. A video decoder 108 uploads the video frame from the device's main processor or central processing unit (CPU) to a GPU memory location. A hardware decoder 110 in the GPU decodes the video frame and performs a color space conversion. The video frame that is decoded may remain in the GPU memory location during the conversion process. A video renderer 112 copies the decoded video frame back to the CPU memory space from the GPU memory location. The web rendering engine 102 constructs a display image in a CPU memory-based canvas by drawing contents below the video, the decoded video frame, and contents above video. After drawing, the web rendering engine 102 updates the web page backing store from the GPU memory on the drawing canvas. The backing store buffers the latest web-page image in the GPU memory.

The display compositor 114 receives from the video renderer 112 all of the video information from the web rending engine, along with any other graphics elements that are to be displayed. The display compositor 114 composites the web contents backing store, the browser user interface (UI) graphics, and the system UI together into a back frame buffer memory location. The display compositor 114 swaps the back frame buffer to a front (primary) buffer that causes the display of the entire screen image on a display screen 116.

Despite the use of a hardware video decoder 110 in the example depicted in FIG. 1, the performance of HD video playback in some user devices may not be acceptable in all situations. For example, a web rendering engine employing the rendering path illustrated in FIG. 1 may produce eleven FPS while utilizing approximately 80% of a processor's capacity to display a 720p high-definition ITU-T H.264/MPEG-4 AVC (ISO/IEC 14496-10—MPEG-4 Part 10, Advanced Video Coding) video. The eleven FPS performance in this media pipeline 100 includes the time required to perform the memory copy between the video decoder 108 and the hardware decoder 110 and CPU-based video frame rendering. Generally, users appreciate high definition video presentations presented at higher FPS rates.

Figure 2:
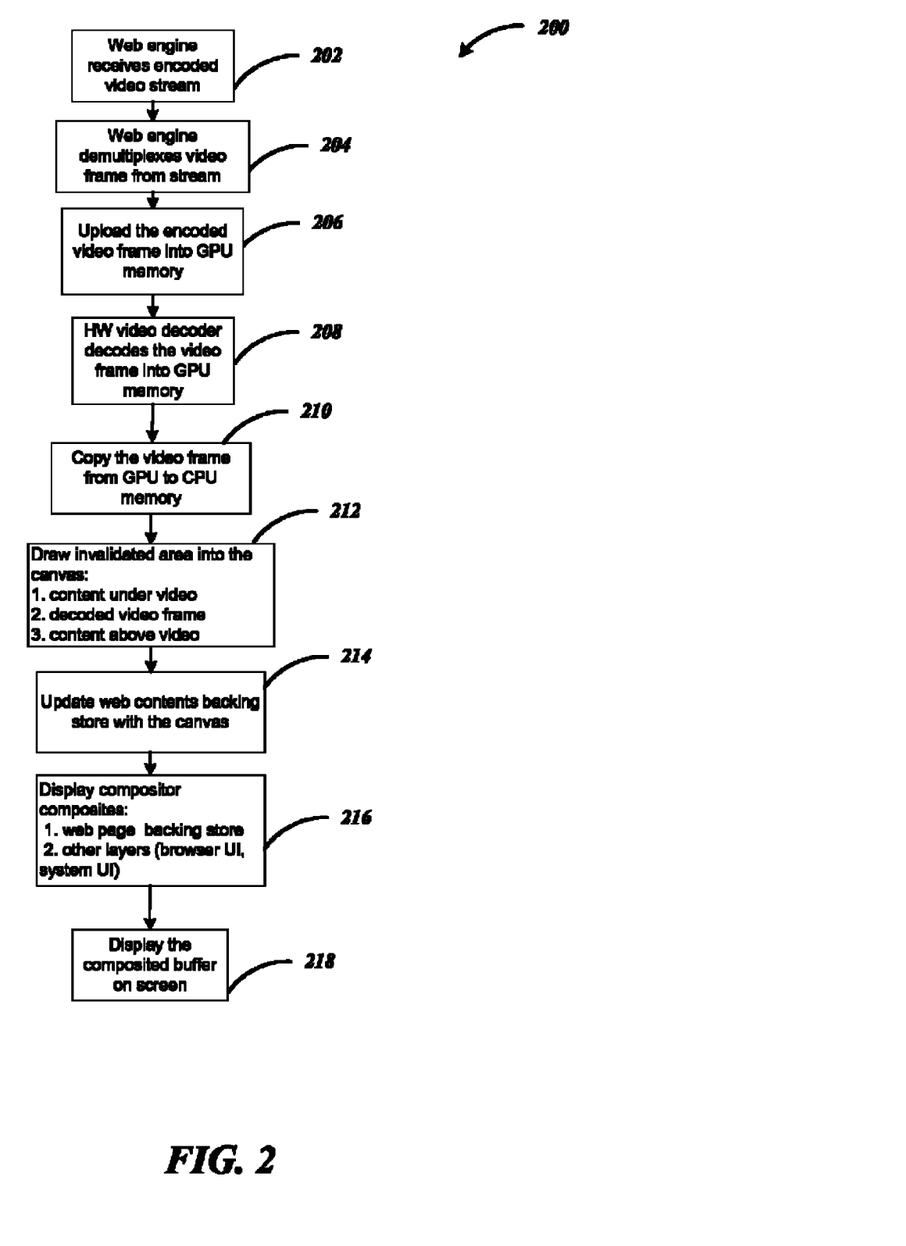
FIG. 2 is a flowchart illustrating a method of delivering a video stream to a web browser on the screen of a computing device.

FIG. 2 illustrates an example process 200 employed by the system depicted in FIG. 1. At 202, a web engine receives data comprising a web page with an encoded video stream. At 204, the web engine may perform a demultiplexing operation to separate the video frame from the video stream. At 206, the demultiplexed frame is copied into a GPU memory location. At 208, a hardware decoder in the GPU may decode the video frame that is stored in the GPU memory.

At 210, the decoded video frame is copied from the GPU memory back to the processor to be included with a rendering of the web page, which, at 212, may include formatting the video content on a background area of the display, and drawing web elements such as a menu, advertisement, or control element that covers any portion of the video (e.g., content that appears above, i.e., in front of, the video). Portions of the video area that are covered are considered invalid and are not included with the rendering of the entire web page that is to be displayed to the user. The covering of some or all of a video frame may occur when user interacts with the web site, for example, entering a search term in a dialog box above a video may trigger a drop down list the may cover a portion of the video content. However, in a large portion of video playback scenarios, videos are presented to an end user without any web elements covering the video.

At 214, the elements that are to appear in front of the video may be stored in a buffer with the visible portion of the video content along with the rendering of the web page. If there are no web elements in front of the video the video canvas in memory is not modified. At 216, a display compositor combines the rendering of the web page, including the decoded video frame, with any other graphics layers such as the web browser UI and the system UI into a single composite image that is transferred to the screen display buffer. At 218, the image in the screen display buffer is depicted on the display screen.

Figure 3:
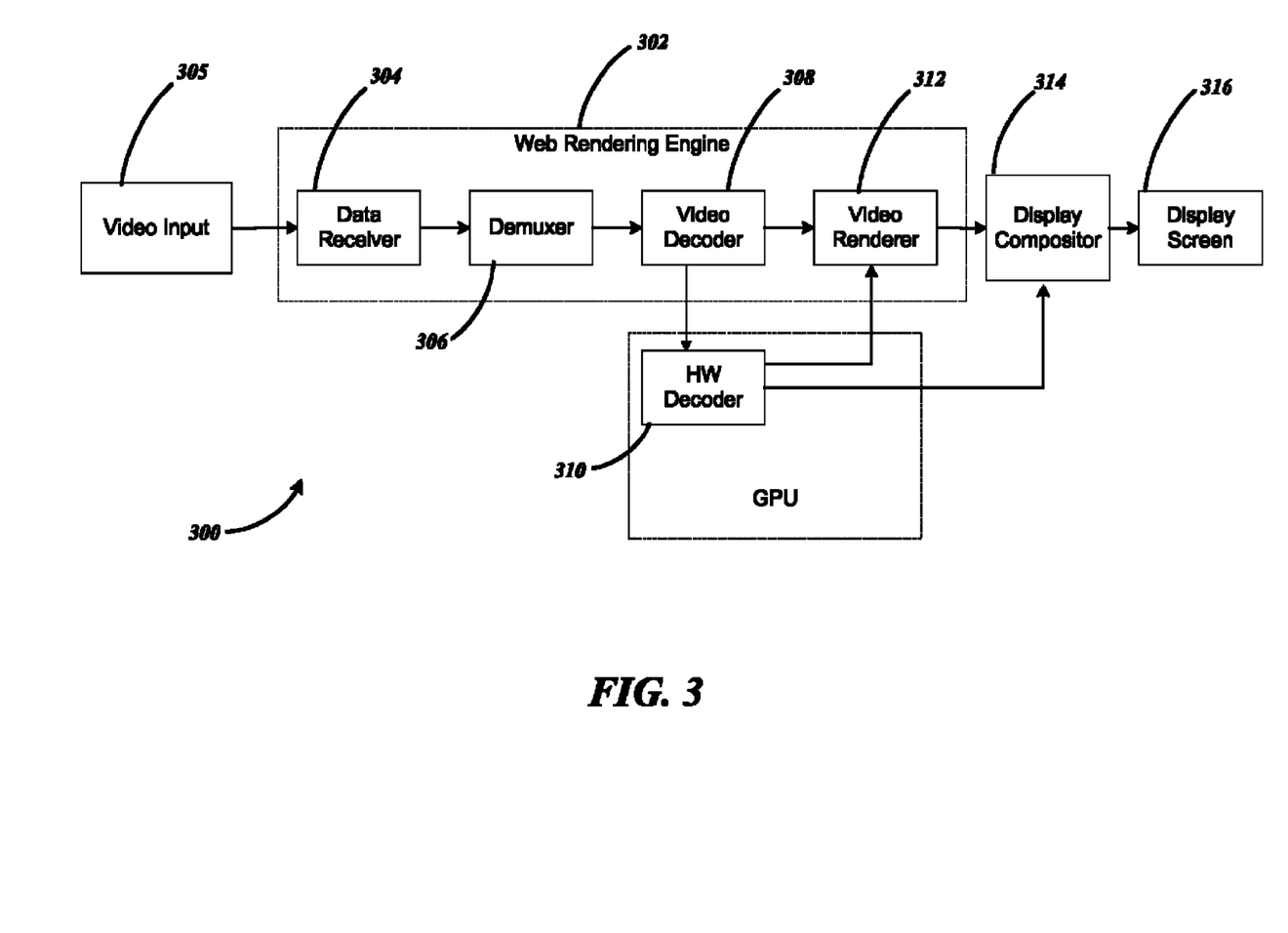
FIG. 3 illustrates a block diagram illustrating a video playback processing system with a hardware decoder configured to accelerate video playback, according to one embodiment.

FIG. 3 illustrates an example of video playback system 300 that may accelerate video display and includes web rendering engine 302 that handles a video stream by repeatedly performing a sequence of receiving, processing, and displaying events for each video frame as it is received. The video playback system 300 includes a display compositor 314 that may directly composite a decoded video frame on a web page received from a hardware decoder 310 in the GPU. The system may include a video covering check in the video decoder 308 to determine which rendering path to use. If there are no web page contents or user interface elements covering video the use of a direct video rendering path from the hardware decoder 310 to the display compositor 314 may accelerate the performance of the video presentation. In situations where a graphics element covers or obscures some or all of the video canvas, the system 300 utilizes a CPU-based rendering path such as the system depicted in FIG. 1.

During operation, data receiver 304 receives a video stream from an input 305, such as a video stream downloaded from the Internet. A demuxer 306 demultiplexes the video stream into separate video frame and audio portions. A video decoder 308 processes the video frame portion of the stream and uploads the video frame from the device from a CPU memory location to a GPU memory location. A hardware decoder 310 in the GPU decodes the video frame and performs a color space conversion on the video frame in the GPU memory location. The video frame that is decoded remains in the GPU memory location during the conversion process.

In the situation where a web page or UI element is obscures or overlap a portion of the video, a video renderer 312 may copy the decoded video frame back to the CPU memory space from the GPU memory location in order to combine the video with the overlapping element. The web rendering engine 302 constructs a display image in a CPU memory-based canvas by drawing contents below the video, the decoded video frame, and contents above video. After drawing, the display compositor 314 receives all of the video information from the web rending engine 302 and composites the web contents backing store, the browser UI graphics, and the system UI together into a back frame buffer. The display compositor 314 swaps the back frame buffer to a front (primary) buffer to display the entire screen image on a display screen 316.

In the situation where a web page or UI element does not obscure or overlap a portion of the video, the use of a hardware decoder 310 may increase the speed and performance of HD video playback by eliminating memory copy operations between the video decoder 308, the hardware decoder 310 and video renderer 312, and reducing the demand for CPU-based video frame rendering.

The web rendering engine 302 constructs a display image in a processor memory-based canvas but does not include the video frame data. After drawing, the display compositor 314 receives the web page data from the web rending engine 302 and the video frame information from the hardware decoder 310. The compositor 314 combines the browser UI graphics, the web page information, the video frame data, and the system UI together into a back frame buffer. The display compositor 314 swaps the back frame buffer to a front (primary) buffer to display the entire screen image on a display screen 316. The compositor 314 updates the portion of the screen containing the video as each new frame is received from the hardware decoder 310.

In one example, the hardware decoder 310 is coupled to the display compositor 314 such that the hardware decoder 310 may provide a pointer to a memory location in the GPU containing video frame data such that the display compositor 314 may read the video frame data from the GPU without the need to perform a memory copy of the video frame data. By reducing the memory copies of video frame between processor and GPU and leverages the GPU to render and composite a video frame with a web page, while also reducing the load on the system processor. The reduction in memory copies can also results in improved throughput that may increase the frame rate capability of the video playback system 300.

Figure 4:
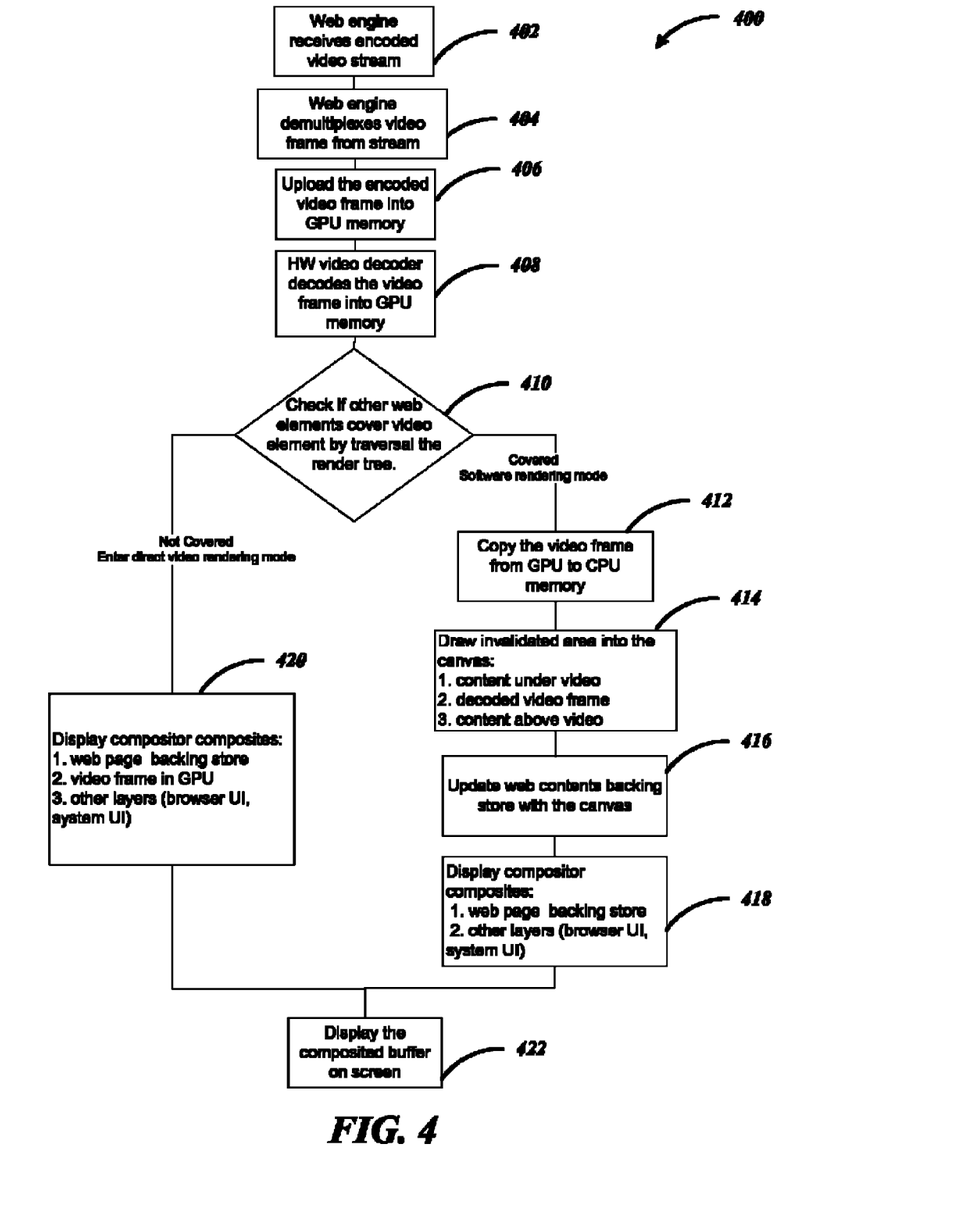
FIG. 4 is a flowchart illustrating a scheme to accelerate video playback based on the position of a video element in a rendering tree, according to one embodiment.

FIG. 4 illustrates an example of a process 400 that may be employed to determine when hardware acceleration may be utilized to improve the display rate of video frames in a web browser. At operation 402, a web engine in the web browser receives data comprising a web page with an encoded video stream. At operation 404, the web engine may perform a demultiplexing operation to separate a video frame from the video stream. At operation 406, the demultiplexed frame is copied into a GPU memory location. At operation 408 a hardware decoder in the GPU may decode the video frame that is stored in the GPU memory.

At operation 410, a check is performed to determine if the video frame as depicted in the web page is obstructed by any other graphical elements. The video covering check 410 utilizes a traversal of a rendering tree maintained by the web engine. The rendering tree is generated based on the layout of the web page. The rendering tree contains the representative information of elements in a HTML document, including position, size, z-order, transparency and transformation, etc. The video covering check 410 may determine if a video canvas is covered by traversing the rendering tree from the video node to upper nodes. During the rendering tree traversal, if an element rectangle in any upper node includes an intersection with the video node's rectangle the video is covered or obscured by that element. If no intersection is found the video is not covered or obscured by any other web elements or user interface graphics.

If the video content is not covered by any other content or element the, web rendering engine may utilize direct video rendering for each frame in the video until a covering is detected. After the hardware video decoder receives the video fame into GPU memory at operation 408, the decoded video frame already remains in the GPU memory.

At operation 420, the web rendering engine may pass a handle (e.g. a memory location pointer indicating the GPU memory location of the video frame) to a display compositor without the need to copy the data representing the video frame from one memory space to a second memory location. The display compositor may then directly composites the web page backing store, decoded video frame and other UI layers together from bottom to top. In one example, the entire composition operation may be performed by the GPU. In addition, the web rendering engine may also pass the style attributes of video element to the display compositor. Style attributes may include a transparency or transformation that the display compositor may apply when compositing the video frame. After the compositing is complete, at operation 422 the compositor may provide the video frame, along with the other web page or UI elements to a hardware buffer that generates the image on a display screen.

The utilization of a direct video rendering path by a system equipped to display videos may significantly improve video playback performance. By reducing the memory copies of video frame between processor and GPU and leverages the GPU to render and composite a video frame with a web page, while also reducing the load on the system processor. Such a direct video rendering path can remove the bottlenecks that would otherwise limit high frame-rate video presentation. Because many video playback scenarios include videos that are presented to an end user without any web elements covering the video, the hardware accelerated operations may offload a majority the video rendering operations from a processor responsible for the web rendering engine.

Use of the direct video rendering path may improve a user's video viewing experience while also maintaining compatibility with the applicable web standards such as HTML5 that include support for web pages that contain video elements. In direct video rendering path, browser and system user interface, such as a dialog or popup, could display on top of video content without impacting the performance. Because cover checking (operation 410) may be performed for each video frame the web rendering engine may efficiently and dynamically switch between the hardware and software based video rendering paths.

If at check operation 410 the web rendering engine determines that any individual frame of the input video is covered, the web rendering image utilizes a software rendering mode that includes operations 412, 414, 416, and 418. At operation 412, the decoded video frame is copied back to the processor to be included with a rendering of the web page. At operation 414, the formatting of the video content on a background area of the display, and drawing any web elements such as a menu, advertisement, or control element that covers any portion of the video (e.g., content that appears above (in front of) the video) is performed. Portions of the video area that are covered are considered invalid and are not included with the rendering of the entire web page that is to be displayed to the user. The covering of some or all of a video frame may occur when user interacts with the web site, for example, entering a search term in a dialog box above a video may trigger a drop down list the may cover a portion of the video content.

At operation 416, the elements that are to appear in front of the video may be stored in a buffer with the visible portion of the video content along with the rendering of the web page. At operation 418, a display compositor combines the rendering of the web page, including the decoded video frame, with any other graphics layers such as the web browser user interface (UI) and the system UI into a single composite image that is transferred to the screen display buffer. After the software compositing is complete, at operation 422 the compositor may provide the covered video frame, along with the other web page or UI elements to a hardware buffer that generates the image on a display screen.

Figure 5:
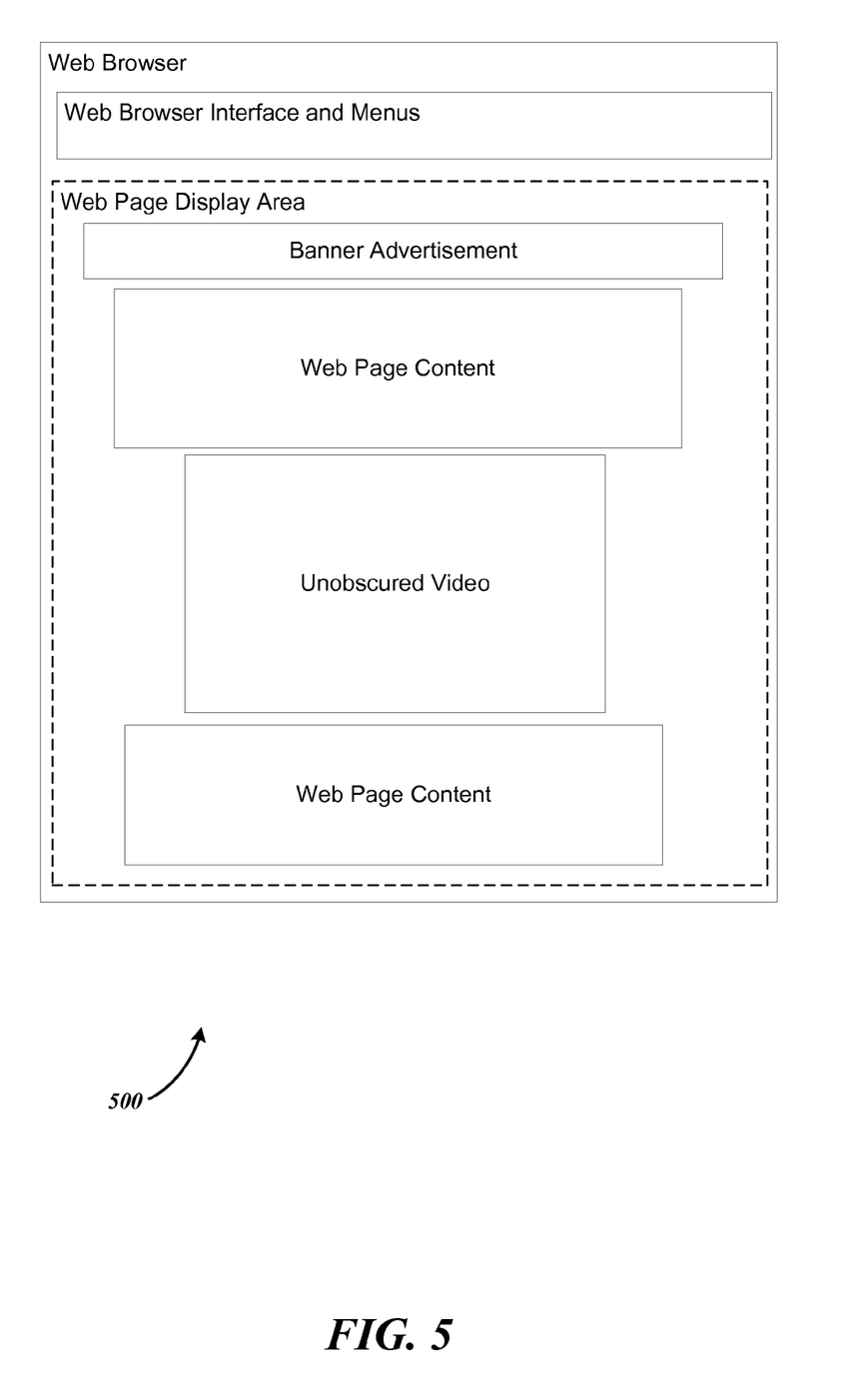
FIG. 5 illustrates an example web browser with an unobscured video element, according to one embodiment.

FIG. 5 illustrates an example of a web browser 500 that includes browser interface and menus and a web page display area. The web page display area contains the rendered image of a web page that includes an unobscured video content area as well as a banner advertisement and web page content areas. In this example, a hardware rendering engine may be utilized to process the unobscured video content area.

Figure 6:
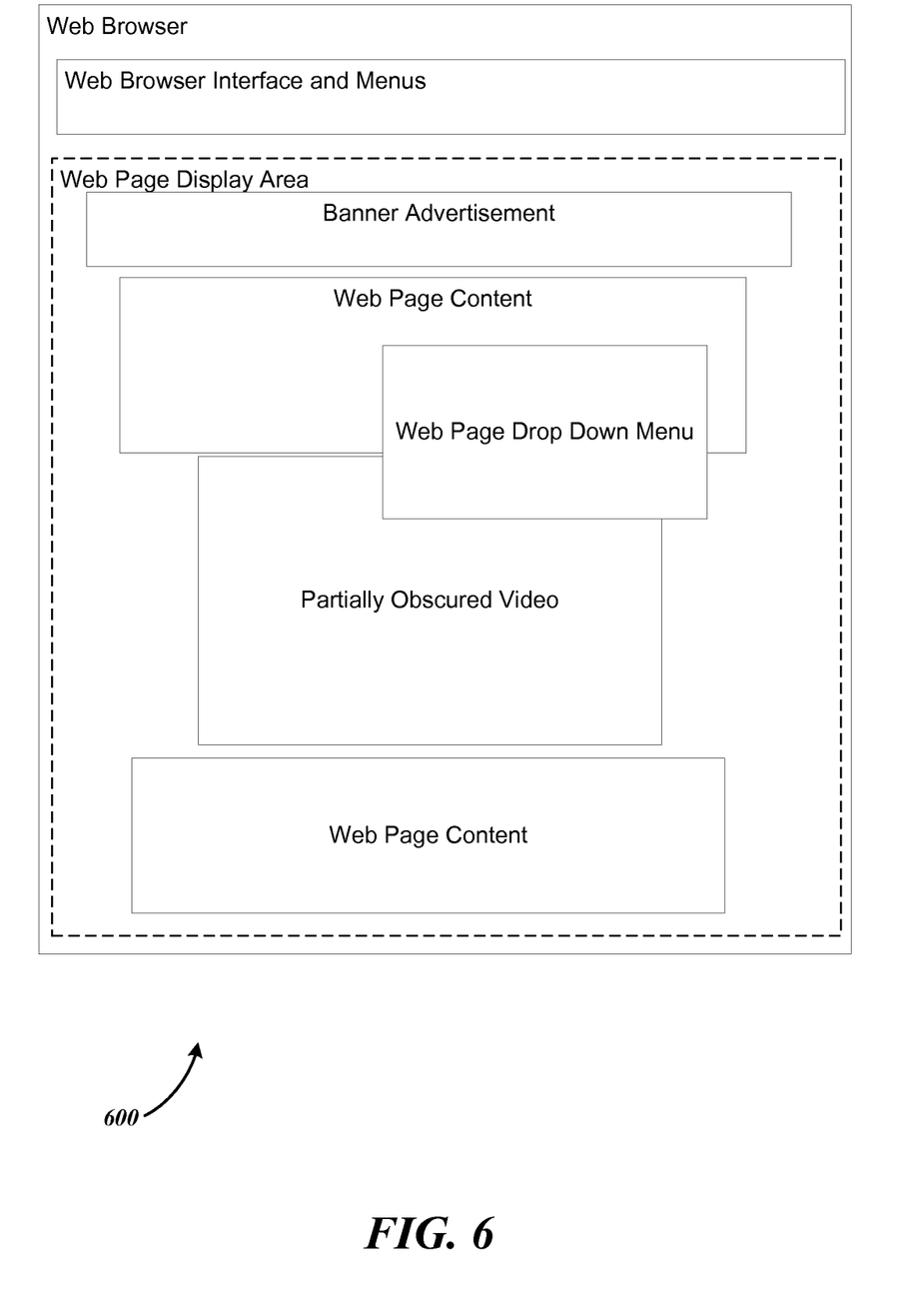
FIG. 6 illustrates an example web browser with a partially obscured video element, according to one embodiment.

FIG. 6 illustrates an example of a web browser 600 that includes the browser interface and menus, and a web page display area as in FIG. 5. The web page display area contains the rendered image of a web page that includes unobscured video content as well as a banner advertisement and web page content areas. In this example, a software rendering engine may be utilized to process the obscured video content area that is overlapped by a web page drop down menu.

Figure 7:
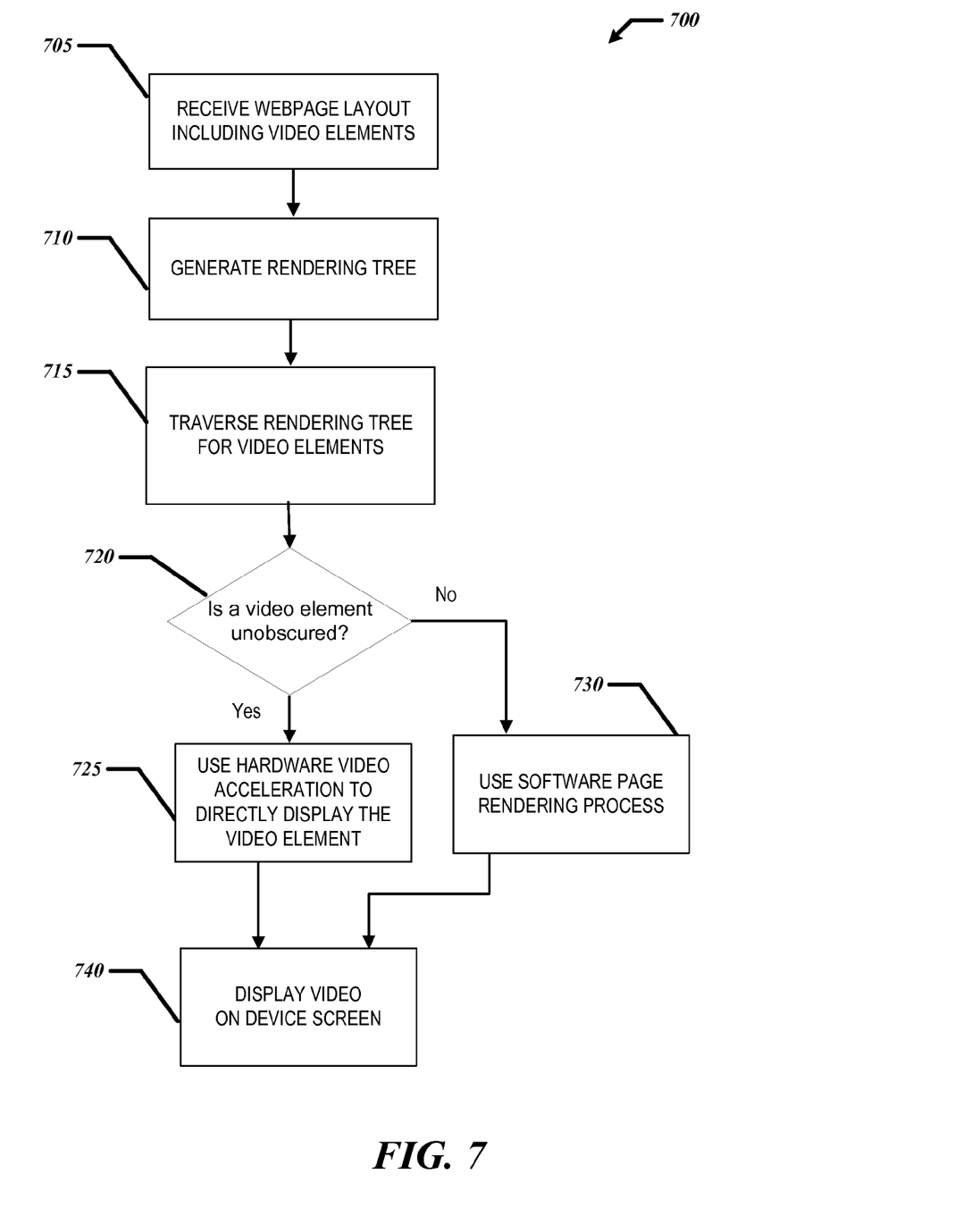
FIG. 7 is a flowchart illustrating a scheme to determine when hardware acceleration may be utilized, according to one embodiment.

FIG. 7 is a flowchart illustrating an example web rendering process 700 for determining if a web page includes an unobscured video element that may benefit from the use of a hardware acceleration module. At operation 705, a web rendering engine receives a webpage that includes a video element. In one example the video element may be a video stream contained in a HTML5 canvas that is to be presented on a mobile computing device. At operation 710 the web engine generates a rendering tree that organizes the layout of all of the elements in the web page with respect to each other. For example if multiple frames overlap the resulting rendering tree may indicate what portion, if any, of each frame should be visible to a user (e.g., what the device will display on a screen). At operation 715 the web engine traverses the completed rendering tree to determine if any video elements are included in the rendering tree. At check operation 720 the web engine performs a video covering check. The video covering check determines if a video found in the rendering tree is obscured. If the video is unobscured, at operation 725 a hardware video acceleration module performs video direct rendering. If the video is obscured, at operation 730 a software page rendering process is utilized to combine the video frame with the obscuring element. At operation 740 the web page and video are displayed on a device display screen. Process 700 may be repeated whenever a change to the layout of any of the webpage elements is received. Check operation 720 may be performed on each video frame received from a video stream.

Figure 8:
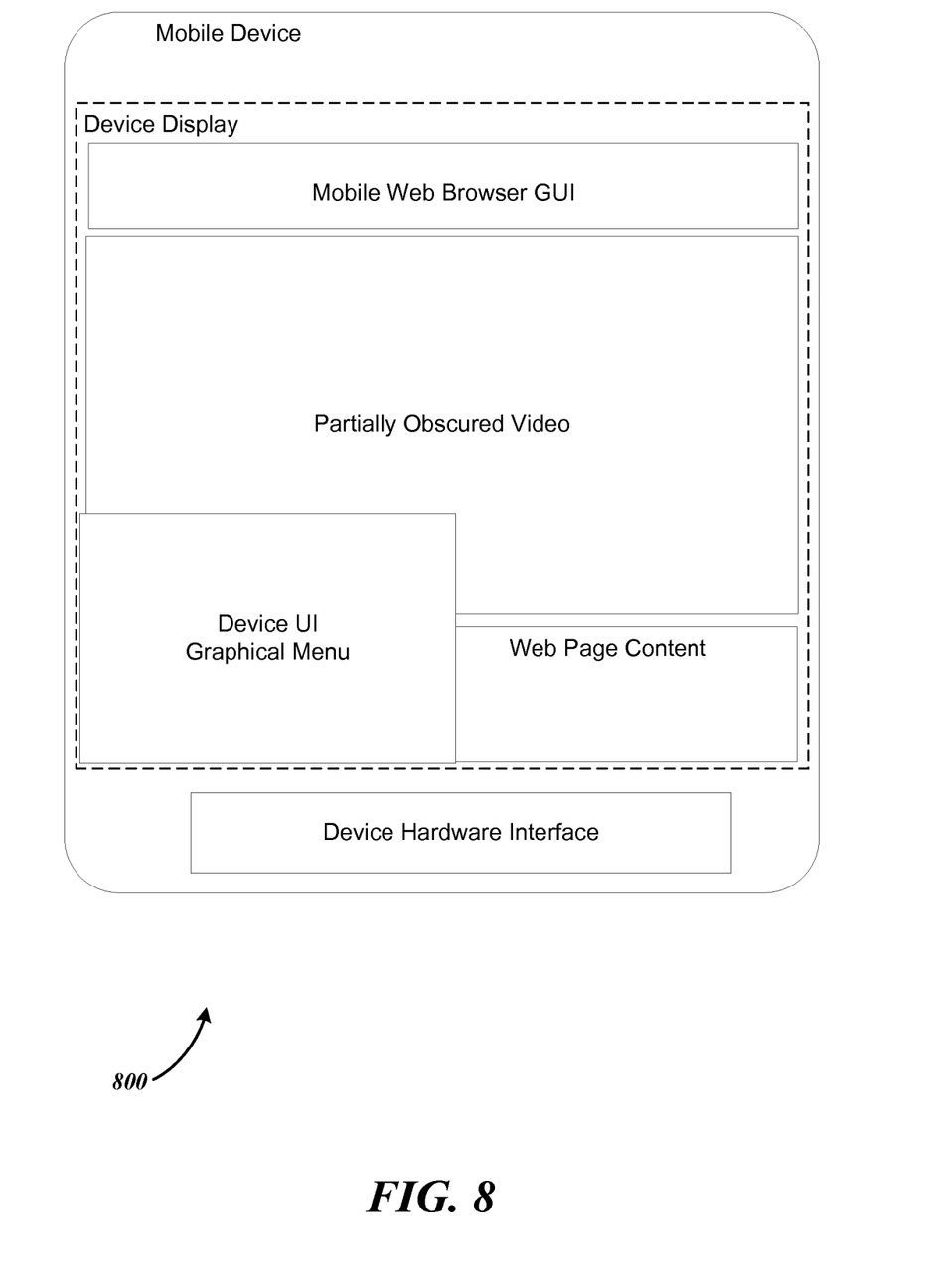
FIG. 8 illustrates an example web browser displayed on a mobile device with a partially obscured video element, according to one embodiment.

FIG. 8 illustrates an example of a mobile device 800 that includes a display device configured to present a mobile web browser. In the depicted example, the web browser includes a browser graphical user interface (GUI), web page content, and a video that is partially obscured by a graphical menu generated by the mobile device. In this example, a software rendering engine may be utilized to process the obscured video content area that is overlapped by a device menu. After a user has selected a menu item, or dismissed the menu such that the video is no longer obscured, a hardware rendering engine may be utilized to process the unobscured video area in the mobile web browser.

Figure 9:
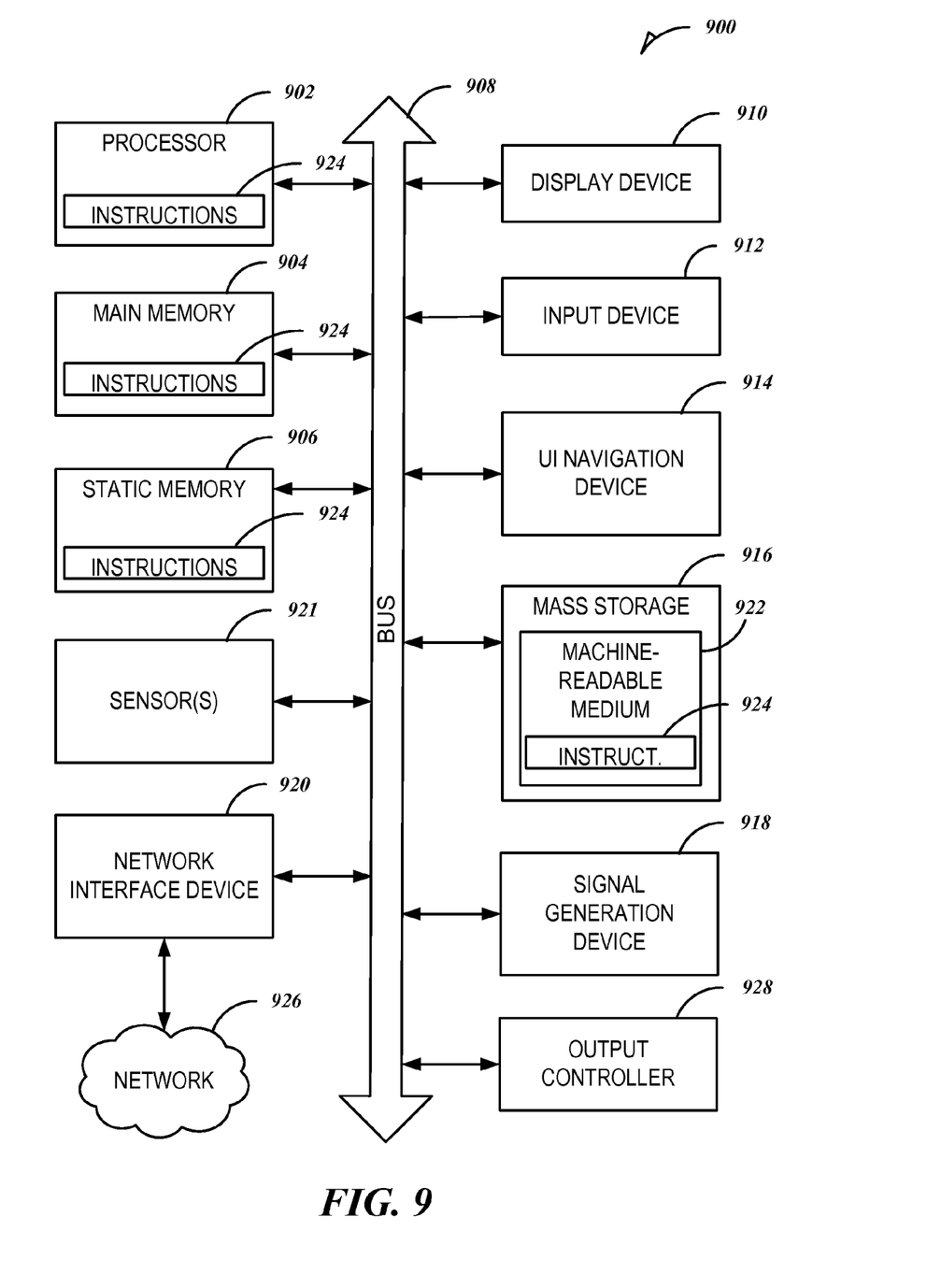
FIG. 9 illustrates a block diagram illustrating an example machine upon which one or more embodiments may be implemented.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via a bus 908. The machine 900 may further include a display unit 910, an alphanumeric input device 912 (e.g., a keyboard), and a user interface (UI) navigation device 914 (e.g., a mouse). In an example, the display unit 910, input device 912, and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR)) connection to communicate or control one or more peripheral devices (e.g., a printer, card reader, etc.).

The storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine-readable medium 922 is illustrated as a single medium, the term "machine readable medium" may include a single medium or multiple media (e.g., a centralized or distributed database, and/or associated caches and servers) that configured to store the one or more instructions 924.

The term "machine-readable medium" may include any tangible medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include but are not limited to: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

ADDITIONAL NOTES & EXAMPLES

Example 1 includes subject matter (such as a system, an apparatus, a device, a method, a process, etc.) that includes receiving a web page that includes a video element, on a computing device including a display screen and a web browser having a web rendering engine; providing the video element to the web rendering engine in the web browser; determining, using the web rendering engine, if any portion of the video element is to be covered by a second element to be displayed; in response, rendering a frame of the video element using a graphics processing unit if the video element is not be covered by the second element to be displayed; and presenting the video frame on the display screen along with the web page.

In Example 2, the subject matter of Example 1 may optionally include copying the video frame from the graphics processing unit to a memory location coupled to a processing unit if the video element is to be covered by the second element; and creating a composite image including both the video frame and the second element.

In Example 3, the subject matter of Examples 1 or 2 the second element to be displayed is included with the web page.

In Example 4, the subject matter of Examples 1, 2 or 3 may optionally include traversing a rendering tree generated by the rendering engine.

In Example 5, the subject matter of Examples 1, 2, 3 or 4 may optionally include providing the video frame to the graphics processing unit or uploading the video frame to a memory location associated with the graphics processing unit.

In Example 6, the subject matter of Examples 1, 2, 3, 4 or 5 may optionally include a hardware decoder configured to directly process video frames stored in a memory location of the graphics processing unit.

In Example 7, the subject matter of Examples 1, 2, 3, 4, 5 or 6 may optionally include checking if each video frame is to be covered by the second element.

Example 8 includes subject matter (such as a tangible computer-readable medium having computer executable instructions that, when executed on a computing device, cause the computing device to perform a method, etc.) that perform a method comprising: receiving a web page that includes a video element, on a computing device including a display screen and a web browser having a web rendering engine; providing the video element to the web rendering engine in the web browser; determining, using the web rendering engine, if any portion of the video element will be covered by a second element to be displayed; in response, rendering a frame of the video element using a graphics processing unit if the video element will not be covered by the second element to be displayed; and presenting a video frame containing the video element on the display screen along with the web page.

In Example 9, the subject matter of Example 8 may optionally include copying the video frame from the graphics processing unit to a memory location coupled to a processing unit if the video element will be covered by the second element; and creating a composite image including both the video frame and the second element.

In Example 10, the subject matter of Examples 8 or 9 the second element to be displayed is included with the web page.

In Example 11, the subject matter of Examples 8, 9 or 10 may optionally include traversing a rendering tree generated by the rendering engine.

In Example 12, the subject matter of Examples 8, 9, 10 or 11 may optionally include providing the video frame to the graphics processing unit or uploading the video frame to a memory location associated with the graphics processing unit.

In Example 13, the subject matter of Examples 8, 9, 10, 11 or 12 may optionally include a hardware decoder configured to directly process video frames stored in a memory location of the graphics processing unit.

In Example 14, the subject matter of Examples 8, 9, 10, 11, 12 or 13 may optionally include checking if each video frame will be covered by the second element.

Example 15 includes subject matter (such as a system, an apparatus, a device, etc.) that includes a display device; a processor configured to receive a video stream embedded in a web page; a graphics processing unit, including a hardware decoder coupled to the display device, communicatively coupled to the processor; and a web rendering engine, using the processor, configured to construct a rendering tree depicting the layout of the web page and to selectively deliver individual video frames from the video stream to the graphics processing unit based on the location of the video stream in the rendering tree; wherein the hardware decoder processes the individual video frames, and delivers the individual video frames that are unobstructed to the display device.

In Example 16, the subject matter of Example 15 may optionally include wherein individual video frames that are obstructed are copied from the graphics processing unit to a memory location coupled to the processor.

In Example 17, the subject matter of Example 15 or 16 may optionally include the hardware decoder is configured to process video frames stored in a memory location of the graphics processing unit.

In Example 18, the subject matter of Example 15, 16 or 17 may optionally include wherein the location of the video stream in the rendering tree indicates that the video stream is obstructed by a second element in the web page.

In Example 19, the subject matter of Example 15, 16, 17 or 18 may optionally include wherein the location of the video stream in the rendering tree indicates that the video stream is unobstructed by another element in the web page.

In Example 20, the subject matter of Example 15, 16, 17, 18 or 19 wherein the display device includes a display compositor coupled to both the hardware decoder of the graphics processing unit and the processor, wherein the display compositor can receive the individual video frames from the hardware decoder or the processor.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claim is:

1. At least one non-transitory computer-readable medium having computer executable instructions that, when executed on a computing device, cause the computing device to perform a method comprising:
   receiving a web page that includes a video element, on a computing device including a display screen and a web browser having a web rendering engine;
   providing the video element to the web rendering engine of the web browser;
   determining, using the web rendering engine, if any portion of the video element is to be covered by a second element to be displayed;
   in response, rendering a frame of the video element using a graphics processing unit without copying the video frame from the graphics processing unit to a memory location coupled to a processing unit of the computing device to perform a software page-rendering process if the video element is not to be covered by the second element to be displayed; and
   presenting a video frame containing the video element on the display screen along with the web page.

2. The computer-readable medium as recited in claim 1, comprising:
   copying the video frame from the graphics processing unit to a memory location coupled to a processing unit if the video element is to be covered by the second element; and
   creating a composite image including both the video frame and the second element.

3. The computer-readable medium as recited in claim 1, wherein determining if any portion of the video element is covered by the second element included with the web page includes traversing a rendering tree generated by the rendering engine.

4. The computer-readable medium as recited in claim 1, further comprising: providing the video frame to the graphics processing unit.

5. The computer-readable medium as recited in claim 1, wherein the graphics processing unit includes a hardware decoder configured to process a video frame stored in a memory location of the graphics processing unit.

6. The computer-readable medium as recited in claim 1, wherein determining if any portion of the video element is covered by the second element included with the web page includes checking if each video frame is covered by the second element.

7. A method for video rendering acceleration comprising:
receiving a web page that includes a video element, on a computing device including a display screen and a web browser having a web rendering engine;
providing the video element to the web rendering engine in the web browser;
determining, using the web rendering engine, if any portion of the video element is to be covered by a second element to be displayed;
in response, rendering a frame of the video element using a graphics processing unit without copying the video frame from the graphics processing unit to a memory location coupled to a processing unit of the computing device to perform a software page-rendering process if the video element is not to be covered by the second element to be displayed; and
presenting the video frame on the display screen along with the web page.

8. The method of claim 7, comprising:
copying the video frame from the graphics processing unit to a memory location coupled to a processing unit of the computing device if the video element is to be covered by the second element; and
creating a composite image including both the video frame and the second element.

9. The method of claim 7, wherein the second element to be displayed is included with the web page.

10. The method of claim 9, wherein determining if any portion of the video element is to be covered by the second element included with the web page includes traversing a rendering tree generated by the rendering engine.

11. The method of claim 10, comprising: providing the video frame to the graphics processing unit.

12. The method of claim 7, further comprising: uploading the video frame to a memory location associated with the graphics processing unit.

13. The method of claim 7, wherein the graphics processing unit includes a hardware decoder configured to directly process video frames stored in a memory location of the graphics processing unit.

14. The method of claim 7, wherein determining if any portion of the video element is covered by the second element included with the web page includes checking if each video frame is to be covered by the second element.

15. A system for accelerated video rendering comprising:
a display device;
a processor configured to receive a video stream embedded in a web page;
a graphics processing unit, including a hardware decoder coupled to the display device, communicatively coupled to the processor; and
a web rendering engine, using the processor, configured to construct a rendering tree depicting the layout of the web page and to selectively deliver individual video frames from the video stream to the graphics processing unit based on the location of the video stream in the rendering tree;
wherein the hardware decoder processes the individual video frames, and delivers the the individual video frames that are unobstructed to the display device without copying the video frames from the graphics processing unit to the web rendering engine to perform a software page-rendering process.

16. The system of claim 15, wherein individual video frames that are obstructed are copied from the graphics processing unit to a memory location coupled to the processor.

17. The system of claim 15, wherein the hardware decoder is configured to process video frames stored in a memory location of the graphics processing unit.

18. The system of claim 15, wherein the location of the video stream in the rendering tree indicates that the video stream is obstructed by a second element in the web page.

19. The system of claim 15, wherein the location of the video stream in the rendering tree indicates that the video stream is unobstructed by another element in the web page.

20. The system of claim 15, the display device including a display compositor coupled to both the hardware decoder of the graphics processing unit and the processor, wherein the display compositor can receive the individual video frames from the hardware decoder or the processor.

* * * * *

UNITED STATES PATENT AND TRADEMARK OFFICE
CERTIFICATE OF CORRECTION

PATENT NO. : 9,443,280 B2
APPLICATION NO. : 13/995687
DATED : September 13, 2016
INVENTOR(S) : Hu et al.

Page 1 of 1

It is certified that error appears in the above-identified patent and that said Letters Patent is hereby corrected as shown below:

In the Claims

In Column 14, Line 20, in Claim 15, after "the", delete "the", therefor

Signed and Sealed this
Thirteenth Day of March, 2018

Andrei Iancu
*Director of the United States Patent and Trademark Office*